United States Patent
Barbison et al.

(10) Patent No.: US 6,923,299 B2
(45) Date of Patent: Aug. 2, 2005

(54) PROGRAMMABLE VARIABLE SPRING MEMBER

(75) Inventors: James M. Barbison, Brampton (CA); Kevin H. Erickson, Etobicoke (CA); Arnett R. Weber, Mississauga (CA); Ronald W. Farewell, Mississauga (CA); Richard Coury, Rochester Hills, MI (US); Thomas R. King, Milton (CA); Stephen H. Bell, Guelph (CA); Nelson C. Goncalves, Mississauga (CA)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/601,976

(22) Filed: Jun. 23, 2003

(65) Prior Publication Data

US 2004/0256185 A1 Dec. 23, 2004

(51) Int. Cl.$^7$ .................................................. F16F 9/53
(52) U.S. Cl. ................. 188/267.1; 188/267; 188/267.2; 267/136
(58) Field of Search .............................. 188/267, 267.1, 188/267.2, 378; 267/136

(56) References Cited

U.S. PATENT DOCUMENTS

| | | | | |
|---|---|---|---|---|
| 4,679,775 A | * | 7/1987 | Funaki et al. ............ 267/64.27 |
| 4,742,998 A | * | 5/1988 | Schubert .................... 267/136 |
| 4,773,632 A | * | 9/1988 | Hartel .................. 267/140.15 |
| 4,869,476 A | * | 9/1989 | Shtarkman ............. 267/140.14 |
| 4,896,754 A | | 1/1990 | Carlson et al. |
| 4,923,057 A | * | 5/1990 | Carlson et al. ............. 188/378 |
| 4,992,190 A | * | 2/1991 | Shtarkman ............... 252/62.52 |
| 5,267,633 A | * | 12/1993 | Endo et al. .............. 188/267.1 |
| 5,505,281 A | * | 4/1996 | Lee .......................... 188/299.1 |
| 5,547,049 A | * | 8/1996 | Weiss et al. ............. 188/267.2 |
| 5,556,083 A | * | 9/1996 | Furihata et al. ............. 267/277 |
| 5,569,432 A | * | 10/1996 | Maciejewski ............... 264/439 |
| 5,810,126 A | * | 9/1998 | Kordonsky et al. ......... 188/267 |
| 5,878,997 A | | 3/1999 | Miesner |
| 5,984,056 A | | 11/1999 | Agnihotri et al. |
| 6,068,249 A | | 5/2000 | Shtarkman |
| 6,158,470 A | | 12/2000 | Ivers et al. |
| 6,279,702 B1 | | 8/2001 | Koh |
| 6,302,249 B1 | | 10/2001 | Jolly et al. |
| 6,312,049 B1 | | 11/2001 | Sullivan et al. |
| 6,318,520 B1 | | 11/2001 | Lisenker et al. |
| 6,318,526 B1 | | 11/2001 | Kruckemeyer et al. |
| 6,340,153 B1 | * | 1/2002 | Miesner ................. 267/140.11 |
| 6,599,439 B2 | * | 7/2003 | Iyengar et al. ........... 252/62.52 |

* cited by examiner

Primary Examiner—Matthew C. Graham
Assistant Examiner—Mariano Sy
(74) Attorney, Agent, or Firm—Carlson, Gaskey & Olds

(57) ABSTRACT

A variable spring member includes a containment housing defining an inner chamber with alternating layers of compressible medium and electro-reactive medium. Adjacent each layer of electro-reactive medium is a coil assembly controlled by a controller. A sealed plate disposed between alternating layers of compressible medium and electro-reactive medium disperses a load exerted on the variable spring member assembly and prevents intermixing of compressible medium with the electro-reactive medium. Actuation of the coil assembly changes physical characteristics and compressibility of the layer of electro-reactive medium to vary spring rate and stiffness.

25 Claims, 2 Drawing Sheets

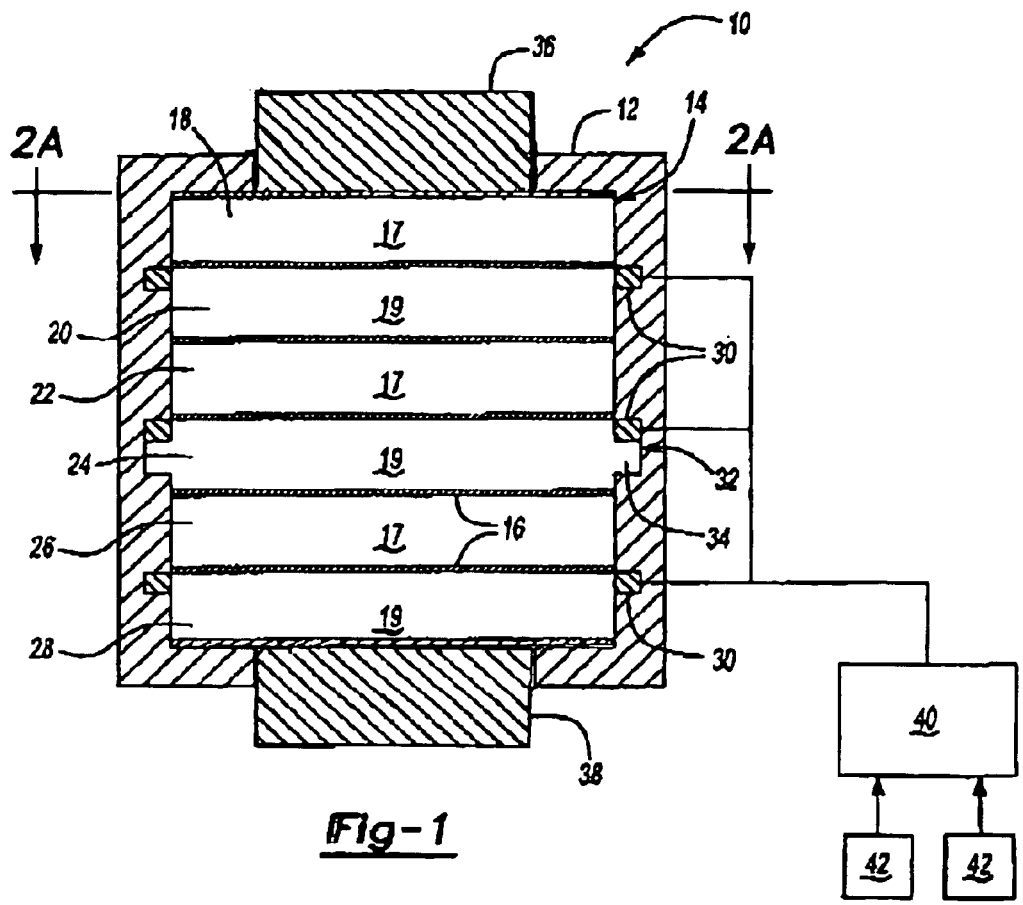
Fig-1
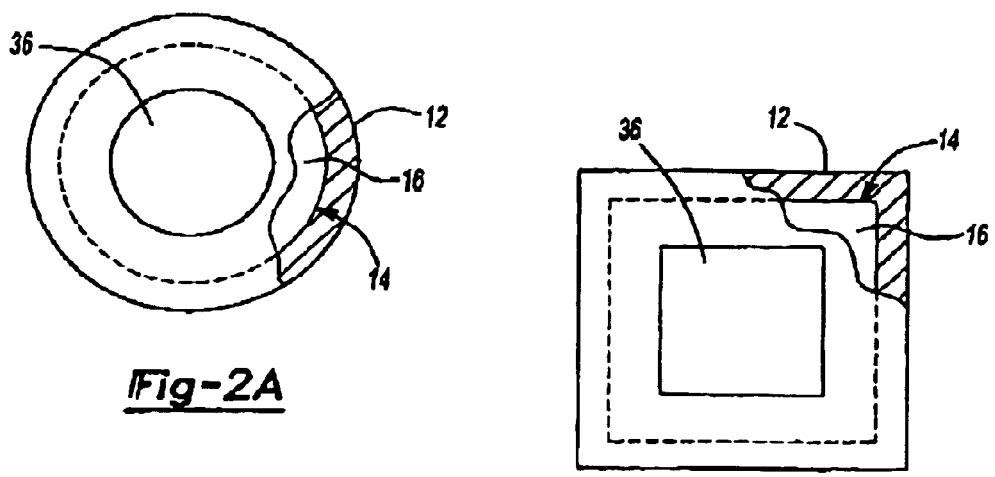
Fig-2A
Fig-2B

PROGRAMMABLE VARIABLE SPRING MEMBER

BACKGROUND OF THE INVENTION

This invention relates to a variable spring member and specifically to a variable spring member including alternating layers of compressible and electro-reactive medium to vary spring rate and stiffness.

A spring is a device capable of absorbing energy and is used in many applications from automotive suspension systems to earthquake survivability systems for buildings. A common type of spring is a coil spring that is typically positioned between two members movable relative to each other. Energy transmitted between members is at least partially absorbed by the coil spring in proportion to physical properties of the coil spring. The stiffness of the coil spring is typically a function of material properties and specific configuration of the coil spring. In some instances, varying the stiffness of the coil spring is desirable to control how energy is absorbed.

Electro-reactive mediums are known in the art and are commonly used within shock absorbers to vary a dampening rate of the shock absorber. Electro-reactive mediums change physical properties in the presence of a magnetic field. Proportionally changing the magnitude of the magnetic field provides a range of dampening characteristics. A typical electro-reactive medium comprises a suspension of tiny magnetic particles disposed within a liquid that significantly increases yield sheer strength when exposed to a magnetic field. The magnitude of the magnetic field determines the proportion of the increase in sheer strength for a specific electro-reactive medium. The increase in sheer strength is achieved by the tiny particles within the medium aligning with a magnetic field.

This phenomenon is common to many different mixtures and types of electro-reactive medium. In such systems a magnetic coil is disposed in the flow path of the dampening fluid between two separated chambers. Changes in the magnetic field vary the viscosity of the electro-reactive fluids to change the flow properties between the two chambers and thereby the dampening rate of the shock absorber.

In some applications, it may be desirable to efficiently absorb input energy while at the same time providing varying degrees of spring stiffness. The degree of stiffness that the device must provide is based on externally determined factors such as applied mass linear rotational acceleration of the object or other environmental conditions. The specific application may also require the use of a device that can have a degree of spring stiffness and the rate of change of spring stiffness controlled accurately and rapidly.

Accordingly, it is desirable to develop a variable spring member capable of varying spring stiffness and rate of change of spring stiffness in response to application specific inputs.

SUMMARY OF THE INVENTION

An embodiment of this application is a variable spring member including alternating layers of electro-reactive medium and compressible medium within a common chamber such that selectively activating layers of electro-reactive medium varies the energy absorption properties of the spring member.

The spring member includes a housing defining an internal chamber within which are layers of compressible medium and electro-reactive medium. Each of the layers are separated by a plate sealed against the inner walls of the chamber. The plates move vertically within the chamber in response to input from attachment members movable relative to the housing. The compressible medium is either a fluid or gas forming a layer separated by the sealed plates. Each layer of compressible medium is adjacent a layer of electro-reactive medium. The electro-reactive medium changes physical properties in the presence of a magnetic field. Each layer of electro-reactive medium is adjacent a coil controlled by a controller. The coil generates a magnetic field that triggers changes in the physical properties of the electro-reactive medium.

Electro-reactive medium includes a suspension of tiny magnetic particles within a liquid that increases the yield sheer strength of the medium in the presence of a magnetic field. The increase in sheer strength is achieved by aligning the suspended magnetic particles with a magnetic field. Alignment of the magnetic particles changes the fluids Theological properties to nearly a plastic consistency.

The stiffness of the spring member is a combination of the compressibility properties of the compressible medium combined with the compressibility properties of the electro-reactive medium. Each of the layers of the spring member compresses in proportion to the physical properties of the compressible medium within that layer. As appreciated by varying the type and consistency of the compressible material within various layers of the spring member, many different spring stiffnesses can be achieved according to application specific requirements.

An embodiment of this invention includes a recess formed within the housing and adjacent a layer of electro-reactive medium. In this embodiment, application of a magnetic field to the electro-reactive medium within the layer adjacent the recesses locks that layer from movement relative to the housing. This in effect changes the stiffness of the variable spring much as a coil spring stiffness changes by locking a number of coils together. Further, locking a center layer of the electro-reactive medium closes off a number of compressible medium layers to significantly change the stiffness of the variable spring member.

An embodiment of the variable spring member includes six layers. Three of the layers are compressible medium and three of the layers are electro-reactive medium. The compressible medium is alternated between layers of electro-reactive medium so that no two adjacent layers are of the same medium.

In another embodiment of this invention, less than six layers are used such that an electro-reactive medium is surrounded by at least one layer of compressible medium. In yet another embodiment of this invention, only a single layer of compressible medium and a single layer of electro-reactive medium are used. The specific number of layers and shape of the spring member is dependent on a specific application.

Accordingly, the variable spring member of this device controls input energy by varying compressibility of various layers of electro-reactive medium disposed within a housing to vary spring rate and stiffness.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a schematic view of a variable spring member assembly;

FIG. 2A is a top view of an embodiment of the variable spring member;

FIG. 2B is a top view of another embodiment of the variable spring member;

DETAILED DESCRIPTION OF THE PREFERRED EMBODIMENT

Figure 3:
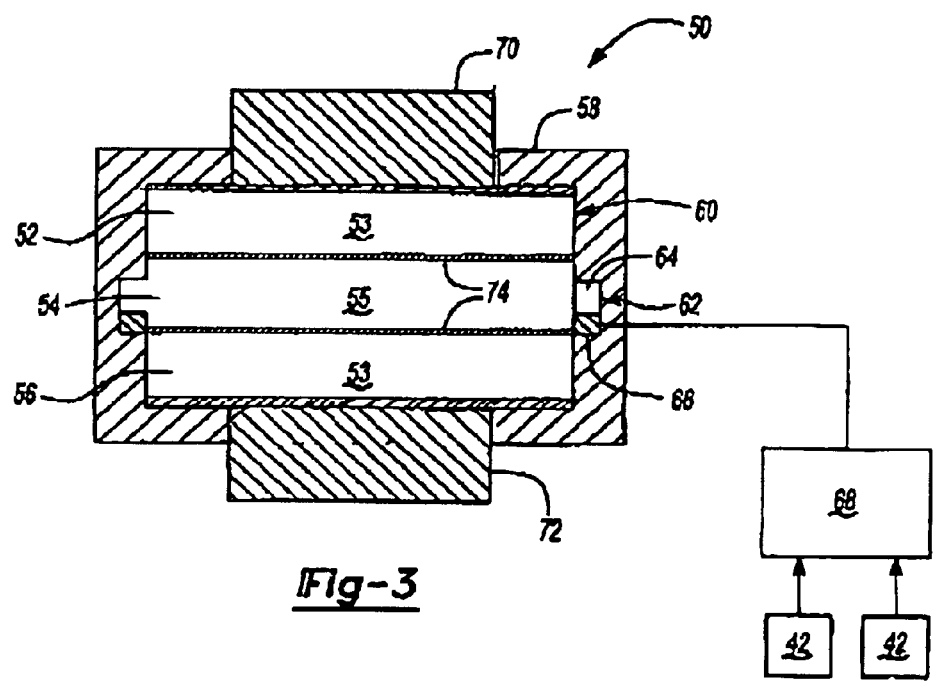
FIG. 3 is a schematic view of another embodiment of the spring member assembly.

Referring to FIG. 1, a variable spring member assembly 10 includes a housing 12 defining an inner chamber 14. Within the chamber 14 are alternating layers of compressible medium and electro-reactive fluid medium. Preferably there are six layers with three layers comprising a compressible medium 17 and three layers comprising a compressible electro-reactive medium 19. Layer one 18 is comprised of compressible medium and separated from a second layer 20 of electro-reactive medium 19, by a sealed plate 16. The sealed plate 16 is disposed between each of the layers of compressible medium 17 and electro-reactive medium 19. The plates 16 are movable within the chamber 14 to allow for absorption of energy input from either an upper attachment member 36 or a lower attachment member 38.

The upper attachment member 36 and the lower attachment member 38 are movable relative to the housing 12. At least one of the upper and lower attachment members 36,38 is attached to one of the sealed plates 16 to transfer input energy to the compressible medium 17 and to the electro-reactive medium 19. The transfer of input energy from the attachment members 36,38 compresses the layers 18,20. The movement of the upper and lower attachment members 36,38 relative to the housing 12 is proportionate to a compressibility of the compressible medium 17 and the electro-reactive medium 19.

The compressible medium 17 disposed within the layers of the variable spring member 10 can be of any type known to a worker skilled in the art. Compressible medium may be a fluid, or may also comprise a gas. The specific type of compressible medium is determined according to the required overall stiffness of the variable spring member assembly 10. It is within the contemplation of this invention that any compressible substance can be used with this invention in combination with other compressible medium to provide the desired spring stiffness.

The second layer 20 comprises electro-reactive medium 19. There are many types of electro-reactive medium 19 known to workers skilled in the art. It is within the contemplation of this invention that any type of electro-reactive medium can be used with this invention to comprise the layers of electro-reactive medium 20,24, and 28. Electro-reactive medium 19 preferably includes a plurality of magnetic particles suspended within a liquid. Application of a magnetic field on the suspended magnetic particles orientates those particles in a specific direction changing the viscosity and physical characteristics of the electro-reactive medium. It is this phenomenon that this invention exploits to vary the stiffness of the variable spring member assembly 10.

As is shown in FIG. 1, layers 18, 22 and 26 contain compressible medium 17 that are not reactive to a magnetic field. These layers 18, 22, 26 are comprised of compressible medium and interposed between the housing and layers of electro-reactive medium 20, 24, 28. Each layer of electro-reactive medium 20, 24, 28 is adjacent a coil assembly 30. Each coil assembly is in communication with a controller 40. The controller 40 actuates the coil to generate a magnetic field of varying magnitude to change and adapt the compressibility or physical natures of the electro-reactive medium to vary the stiffness of the variable spring member.

The chamber 14 includes the upper and lower attachment members 36, 38 that are configured for a specific application. A worker knowledgeable in the art with the benefit of this disclosure would understand how to mount the spring member assembly 10 for a specific application. Each of the layers 18, 20, 22, 24, 26 and 28 are separated by sealed plates 16 movable within the chamber 14 and prevent intermixing of the compressible medium 17 with the electro-reactive medium 19. The plates 16 also act to distribute the applied load from the upper and lower attachment members 36, 38 across the entire cross-sectional area of the different layers.

Referring to FIGS. 2A and 2B, the specific cross-sectional area of the variable spring member assembly 10 may be or any shape as required by the specific application. FIG. 2A illustrates one embodiment of the variable spring member assembly 10 having a circular cross-sectional area. FIG. 2B illustrates another embodiment of the variable spring member having a square cross-sectional area. Note that it is within the contemplation of this invention that any cross-sectional area as is known by a worker in the art may be used depending on application specific requirements of the variable spring member assembly 10.

The alternating layers of compressible medium 18, 22, 26 and electro-reactive medium 20, 24, 28 provide an overall stiffness of the entire spring member assembly. The controller 40 receives inputs 42 indicative of environmental rectors for a specific application. The controller then excites the coil assemblies 30 to vary the physical properties of electro-reactive medium 19 within each layer. Each of the layers of electro-reactive medium may be activated simultaneously or individually, depending on the stiffness desired of the spring member in response to specific environmental conditions. Further, each of the layers or electro-reactive medium may be excited at different magnitudes to further vary the range of spring stiffnesses achievable by the variable spring member assembly 10.

The housing 12 defines a recess 32 adjacent layer 24 of electro-reactive medium. This recess 32 corresponds to a shoulder 34 formed of electro-reactive medium 19 disposed within the recess 32. Energizing the coil 30 locks the layer 24 from movement relative to the inner walls of the chamber 14. Locking the layer 24 removes layers above and below from engagement to change the stiffness of the variable spring member assembly 10. Locking layer 24 changes the overall stiffness of the variable spring member assembly 10 to that of the layers 18, 20, 22 for any input through the upper attachment member 36. Locking layer 24 functions much like locking one or more coils of a spring together in a conventional coil spring member to change and increase the stiffness of the coil spring. As appreciated, locking the layer 24 prevents movement of the lower layers 26, 28 through a full range movement allowable when the layer 24 is not in an energized end locked position. The controller 40 can energize the layer 24 separately from the other layers 20,26 of electro-reactive medium 19 in order to change the stiffness characteristics of the variable spring member assembly 10.

Referring to FIG. 3, another embodiment of the variable spring member 50 is shown including only three layers 52, 54 and 56. The variable spring member 50 includes a housing 58 defining an inner chamber 60. The center layer 54 comprises electro-reactive medium 55. Note that it is within the contemplation of this invention that the variable spring member may include any number of layers in order to provide the specific stiffness requirements for each individual application.

The variable spring member 50 includes a recess 62 within the inner chamber 60 of the housing 58. The layer 54 of electro-reactive medium 55 is adjacent the coil assembly 66. The coil assembly 66 is controlled by controller 68. Attachment members 70, 72 attach to the structure or structures movable relative to the variable spring member 50. In this embodiment, the layers 52 and 56 comprise the compressible medium and act in concert with the electro-reactive medium 55 providing the overall stiffness of the variable spring member 50. Energizing the coil assembly 66 locks the central layer 54 of electro-reactive medium 55 that in turn reduces the number of compressible layers capable of absorbing input energy. Reduction in engaged layers changes stiffness providing the desired variation in spring stiffness.

Further, each layer of compressible medium 52, 56 may be of a different compressible medium 53 with differing compressibility properties. Different compressibility medium provides different spring stiffness rates depending on the direction of input energy. For example, input energy through the upper attachment member 70 would encounter a stiffness rate provided by layer 52 and input from lower attachment member 72 would encounter the stiffness controlled by the specific characteristics of layer 56. By providing layers of different compressible medium 53, the variable spring member 50 can be tailored to the configuration and requirements of each specific application.

Figure 4:
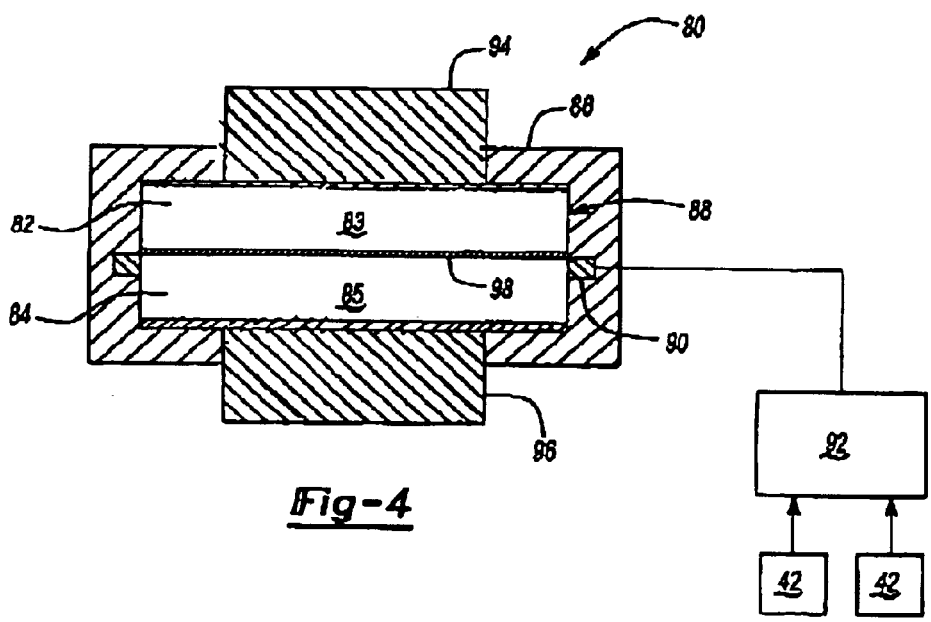
FIG. 4 is a schematic view of yet another embodiment of the spring member assembly.

Referring to FIG. 4, yet another embodiment of the variable spring member is shown at 80 and includes first and second layers 82, 84. A first attachment member 94 and a second attachment member 96 move relative to the housing 86. The first attachment member 94 and the second attachment member 96 transmit input energy to the first and second layers 82, 84. Housing 86 defines a chamber 88 including plate 98. The plate 98 move vertically within the chamber 88 and separate the compressible medium 83 and electro-reactive medium 85 within layers 82, 84. A coil assembly 90 installed adjacent layer 84 of electro-reactive medium 85 responds to signals from controller 92. The controller 92 adjusts physical characteristics of the electro-reactive medium 85 varying compressibility of the layer 84. Adjustments of the physical properties of the electro-reactive medium 85 changes the compressibility of the electro-reactive layer 84 thereby varying the stiffness of the variable spring member 80.

Selectively activating and deactivating layers of electro-reactive medium causes variable stiffness of the spring member altered by varying the magnitude of the applied magnetic field in one or all of the layers of electro-reactive medium. The overall properties of the spring member are also altered by varying the sheer strength of the compressible medium disposed between layers of electro-reactive medium. The cross-sectional diameter and length of the containment chamber are determined by requirements of the specific application. The required spring properties of the specific application would also determine the number and composition of fluid layers in the device. In addition, the thickness and amount of compressible medium forming each layer are also determined by application specific requirements.

The variable spring member controller analyzes input signals generated by external events such as applied forces or accelerations and communicates information to each of the electrical coils about whether the magnetic field should be on or off. Further, the controller varies the magnitude of the magnetic force and the duration of the magnetic field to control and tailor the response of the variable spring member to the specific application. The controller may also be programmed to recognize specific input signals and to implement a series of inputs to the coil assemblies to counter specific environmental situations, such as for example building movements caused by an earthquake, or wheel assembly movements on a motor vehicle.

This invention also includes a method of absorbing input energy with the variable spring member assembly 10. The method comprises the steps of separating alternating layers of compressible medium and electro-reactive medium within a housing. The method continues by sensing external conditions indicative of predetermined conditions and creating a magnetic field adjacent the electro-reactive medium for adjusting the compressibility of each of the electro-reactive layers in response to those external inputs. The method further includes the step of locking one of the layers of electro-reactive medium in order to contain one or more layers of compressible medium. The method also includes the stop of varying the magnetic field of each of the electro-reactive mediums independent of each other in order to provide a varying overall stiffness of the variable spring member. As is appreciated, it is within the contemplation of this invention that the controller will be able to control the coil assemblies for each or the electro-reactive medium layers independent of each other in order to vary the overall stiffness of the variable spring member.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A variable rate spring assembly comprising:
   a housing defining a chamber;
   a layer of compressible medium dispose within said chamber;
   a layer of electro-reactive medium disposed within said chamber, wherein said layer of electro-reactive medium is different than said layer of compressible medium;
   a coil assembly associated with said layer of electro-reactive medium;
   a controller in communication with said coil assembly to control a magnetic field generated by said coil assembly; and
   at least one attachment member movable relative to said housing.

2. The assembly of claim 1, wherein said at least one attachment member moves relative to said housing proportionate to a compressibility of said layer of compressible medium and said layer of electro-reactive medium.

3. The assembly of claim 1, wherein said layer of compressible medium and said layer of electro-reactive medium move within said chamber in response to energy input from said attachment member.

4. The assembly of claim 1, wherein said housing includes a recess, and said layer of electro-reactive medium extends into said recess for limiting movement of said layer of electro-reactive medium relative to said housing.

5. The assembly of claim 4, wherein said layer of electro-reactive medium locks into said recess preventing movement of said layer of electro-reactive medium relative to said housing.

6. The assembly of claim 1, wherein said layer of compressible medium comprising at least two layers of compressible medium with one layer of compressible medium disposed above said layer of electro-reactive medium and another layer of compressible medium disposed below said electro-reactive medium.

7. The assembly of claim 1, wherein said layer of compressible medium and said layer of electro-reactive medium are separated by a sealed plate movable relative to said housing.

8. The assembly of claim 7, wherein said sealed plate defines a cross-sectional area for distributing a load placed on said variable rate spring assembly.

9. The assembly of claim 7, including a plurality of said sealed plates, wherein each of said plurality of sealed plates are the same size.

10. The assembly of claim 7, including a plurality of sealed plates, wherein at least one of said plurality of sealed plates is of a different size than another of said plurality of sealed plates.

11. The assembly of claim 7, wherein said attachment member is attached to said sealed plate.

12. The assembly of claim 1, wherein said controller varies electric current supplied to said coil assembly to vary compressibility characteristics of said layer of electro-reactive medium.

13. The assembly of claim 1, comprising three layers of compressible medium and three layers of electro-reactive medium.

14. The assembly of claim 13, wherein said three layers of compressible medium and said three layers of electro-reactive medium are alternated such that no two adjacent layers are identical.

15. The assembly of claim 1, comprising a stiffness variable in response to said magnetic field applied to said layer of electro-reactive medium.

16. The assembly of claim 15, wherein said stiffness of said variable rate spring assembly varies proportionately with a magnitude of said magnetic field.

17. The assembly of claim 1, further including multiple layers of said compressible medium, and at least two of said multiple layers of compressible medium comprise different compressible medium.

18. The assembly of claim 1, further including multiple layers of said electro-reactive medium, and at least two of said multiple layers of electro-reactive medium comprise different electro-reactive medium.

19. The assembly as recited in claim 1, including a plate movable within said chamber relative to said housing, said plate preventing intermixing of said compressible medium and said electro-reactive medium.

20. The assembly as recited in claim 1, wherein said at least one attachment member comprises a first attachment member and a second attachment member movable relative to said housing and each other.

21. A method of absorbing energy comprising the steps of:
a. separating adjacent layers of compressible medium and electro-reactive medium within a housing with movable plates, where said electro-reactive medium is different from said compressible medium;
b. attaching a first member movable relative to the housing to a first structure;
c. attaching a second member movable relative to the housing to a second structure movable relative to said first structure;
d. absorbing energy input from either of said first or second members in proportion to an overall compressibility of the adjacent layers of compressible medium and electro-reactive medium.

22. The method of claim 21, comprising the step of creating a magnetic field associated with said electro-reactive medium, and varying said overall compressibility in proportion to a magnitude of said magnetic field.

23. The method of claim 22, comprising varying said magnitude of said magnetic field in response to signals received by a controller indicative of changes in a predetermined condition.

24. The method of claim 21, comprising the step of dispersing input energy over a surface of the compressible medium and the electro-reactive medium through said movable plates.

25. A variable rate spring assembly comprising:
a chamber defined within a housing;
a layer of dampening fluid;
a layer of electro-reactive fluid separated from said dampening fluid, where said electro-reactive fluid is different than said dampening fluid;
a plurality of plates movable within said chamber separating said layers;
a magnetic field generator adjacent said layer of electro-reactive fluid, said magnetic field generator generating a magnetic field for varying a dampening rate of said electro-reactive fluid; and
an attachment member movable relative to said housing according to a combined dampening rate of said dampening fluid and said layer of electro-reactive fluid.

* * * * *